US012257790B2

(12) United States Patent
Ruijs

(10) Patent No.: US 12,257,790 B2
(45) Date of Patent: Mar. 25, 2025

(54) CYLINDRICALLY SHAPED CARBON FIBRE REINFORCED PART AND METHOD FOR ITS MANUFACTURE

(71) Applicant: Moba Group B.V., Barneveld (NL)

(72) Inventor: Johannes Henricus Maria Ruijs, Barneveld (NL)

(73) Assignee: Moba Group B.V., Barneveld (NL)

( * ) Notice: Subject to any disclaimer, the term of this patent is extended or adjusted under 35 U.S.C. 154(b) by 19 days.

(21) Appl. No.: 17/925,345

(22) PCT Filed: May 17, 2021

(86) PCT No.: PCT/NL2021/050316
§ 371 (c)(1),
(2) Date: Nov. 15, 2022

(87) PCT Pub. No.: WO2021/235931
PCT Pub. Date: Nov. 25, 2021

(65) Prior Publication Data
US 2023/0191725 A1 Jun. 22, 2023

(30) Foreign Application Priority Data

May 18, 2020  (EP) .................................... 20020233
Jul. 21, 2020   (NL) .................................... 2026105

(51) Int. Cl.
*B29C 70/52* (2006.01)
*A01K 43/00* (2006.01)
(Continued)

(52) U.S. Cl.
CPC ............. *B29C 70/52* (2013.01); *A01K 43/00* (2013.01); *B29C 45/14598* (2013.01); *B29C 45/14631* (2013.01); *B29C 70/086* (2013.01)

(58) Field of Classification Search
CPC ....... B29C 70/52; B29C 70/086; B29C 70/74; B29C 70/747; B29C 45/14598;
(Continued)

(56) References Cited

U.S. PATENT DOCUMENTS 2,044,981 A * 6/1936 Guttman ............... B07C 5/3416
209/912
2,531,292 A * 11/1950 Page ........................ B07C 5/02
198/779
(Continued)

FOREIGN PATENT DOCUMENTS

DE        195 38 360        4/1997
DE    10 2009 056472        6/2011
(Continued)

OTHER PUBLICATIONS

EPO Communication dated Dec. 12, 2023 in European Application No. 21 727 611.2-1014.
(Continued)

*Primary Examiner* — Philip C Tucker
*Assistant Examiner* — Brian R Slawski
(74) *Attorney, Agent, or Firm* — Stephen J. Weyer, Esq.; Stites & Harbison, PLLC

(57) ABSTRACT

The present invention relates to a device, for example a machine part, comprising:—a body with a cylinder shape of substantially carbon fibers with the fibers in the longitudinal direction of the cylinder shape, the body functioning as carrier body with a carrier surface, and—at least a single circumferential body of a plastic provided through injection molding on the body, the circumferential body being provided on at least a part of the carrier surface. Further, the present invention concerns a method for manufacturing the device, comprising:—manufacturing with pultrusion the cylinder shape of substantially carbon reinforced fiber mate-
(Continued)

Figure 1:
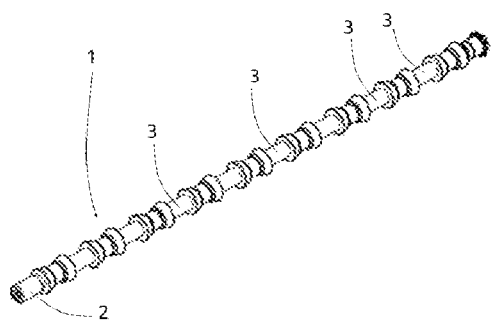

rial with carbon fibers substantially in the longitudinal direction of the cylinder shape, and—injection molding of a plastic on the cylinder shape for obtaining the circumferential body on at least a part of the carrier surface.

29 Claims, 3 Drawing Sheets

(51) Int. Cl.
*B29C 45/14* (2006.01)
*B29C 70/08* (2006.01)

(58) Field of Classification Search
CPC ..... B29C 45/1431; A01K 43/00; F16C 13/00; F16C 13/006; F16C 3/026; F16C 2220/04; Y10T 29/49549; Y10T 29/49554; B65G 17/24; B65G 2201/02; B65G 2201/0202; B65G 17/0208; B65G 17/0211; B07C 5/04; B07C 5/06; B07C 2501/0081; B07C 2501/009; B65B 23/02; B65B 23/04; B65B 23/06; B65B 23/08; B65B 23/00
USPC .......... 156/60, 156, 245, 187, 194; 264/239, 264/259, 260; 492/50, 49, 27, 28, 30, 36, 492/39; 198/348, 367, 434, 436, 570, 198/601; 209/240, 241, 233, 243, 247, 209/261, 264, 659, 667, 671; 29/895.21, 29/895.213
See application file for complete search history.

(56) References Cited

U.S. PATENT DOCUMENTS

| | | | | |
|---|---|---|---|---|
| 4,029,196 A | * | 6/1977 | Ekholm | B65G 47/248 83/706 |
| 4,750,316 A | * | 6/1988 | Bliss | B65B 23/06 53/247 |
| 4,776,465 A | * | 10/1988 | McEvoy | A01K 43/00 198/482.1 |
| 5,318,742 A | | 6/1994 | You | |
| 5,842,711 A | | 12/1998 | Legerot | |
| 6,202,557 B1 | | 3/2001 | Kustermann | |
| 6,729,466 B2 | * | 5/2004 | Lerch | B29C 45/16 492/38 |
| 9,409,723 B2 | | 8/2016 | Seidl et al. | |
| 2003/0077409 A1 | | 4/2003 | Schnell | |
| 2003/0201209 A1 | * | 10/2003 | De Baerdemaeker | G01N 33/025 209/576 |
| 2013/0264174 A1 | | 10/2013 | Seidl et al. | |
| 2014/0302975 A1 | * | 10/2014 | Arai | B29C 45/1615 425/588 |

FOREIGN PATENT DOCUMENTS

| | | |
|---|---|---|
| DE | 10 2014 004158 | 9/2015 |
| JP | S52122583 A | 10/1977 |

OTHER PUBLICATIONS

International Search Report for PCT/NL2021/050316 dated Jul. 28, 2021.
International Preliminary Report on Patentability for PCT/NL2021/050316 dated Aug. 17, 2022.

* cited by examiner

CYLINDRICALLY SHAPED CARBON FIBRE REINFORCED PART AND METHOD FOR ITS MANUFACTURE

The present invention relates to a device, for example a machine part, and to a method for manufacturing a machine part.

Such a device is known from U.S. Pat. No. 6,202,557, which describes a shaft body applied as a roll in printing offices for making paper. Because the size and the weight of such a shaft are large, in such an application the body is made of carbon reinforced fiber. It is further described that for the manufacture of the body a winding process for networks of such material is used. Unlike the function of a particular machine part as a link in a string of parts, the function of the polyurethane cover mentioned in U.S. Pat. No. 6,202,557 is that of providing friction for displacing defined materials. It is clear that the body mentioned comprises woven carbon fiber.

In EP2650101 pairs of roller shafts are described, intended for oriented displacement of small containers of plastic and having a similar function, namely the friction, as a result of which reliable serial processing is obtained. Here also, the roller shafts comprise woven carbon fiber.

In U.S. Pat. No. 5,842,711 it is described how parts of a bicycle frame can be put together and assembled. More particularly, short frame bar sections are obtained with pultrusion of for instance carbon reinforced fiber-containing materials. Of coupling pieces, it is mentioned that these have been provided by overmolding.

It will be clear to those skilled in the art that these short bar sections comprise a woven structure of carbon reinforced fibers. Only then is it possible, where sudden movements and loads during cycling are concerned, to prevent breaking or tearing of such bar parts, precisely because such a woven structure provides flexibility and resilience.

For bar sections of similar structure, reference is also made to U.S. Pat. No. 5,318,742 where layers of fibers are successively wound onto an inner tube.

A further reference for carrier parts obtained with pultrusion of carbon fiber-woven plastics material, and then provided with parts arranged thereon through overmolding, is found at epsilon-composite.com under 'TECHNOLOGIES AND MANUFACTURING PROCESSES'.

In the present patent application, the terms cylinder, cylindrical body, cylinder shape, and cylindrical or cylinder-shaped are mentioned and used. As a reference for the meaning of these terms, mention is made here of Kern and Bland, SOLID MENSURATION, $2^{nd}$ edition, Wiley and Sons, 1948, page 32, where a general definition of a cylindrical surface is given. In the case of cross sections that are to be specifically chosen and used, for example, but not exclusively, circular, or square, or rectangular, this will be indicated explicitly.

For the technology of processes for the processing of plastics, among which processes such as injection molding, extrusion, pultrusion, and overmolding, the following references are listed and explained below.

A general reference for such processes is described in "Design and Manufacture of Composite Structures", Geoff Eckold, 261-265, ISBN 0 07 018961 7.

More particularly, pultrusion is a continuous manufacturing process whereby fibers (for example carbon fibers) which provide for properties such as strength and stiffness are impregnated with a resin (called thermoset). After this impregnation, the fibers are pulled through a heated die. The die determines the eventual shape of the profile (for example, a cylindrical body). Curing of the resin takes place in the die.

The profile is pulled through the die by means of pull units and adjusted to the right length with a saw.

In "Materials Science of Polymers for Engineers", Hans Gardner Publications, 2nd ed., Tim Osswald, Georg Menges, 233-239, ISBN 1 56990 348 4, among other processes, injection molding is described. More in detail, injection molding of plastics is a shaping technique for thermoplasts, thermosets, and metals having a low melting point. In the process, plastic is supplied as a granulate or powder, melted to form a viscous mass and then, at high pressure, injected into a mold whose cavity has the shape of the desired product. By cooling, the plastic solidifies and the desired product is obtained.

The term overmolding stands for the application of plastic onto an existing solid material part through injection molding.

For an overview of types and properties of the many plastics and materials, reference is made to:

"Kunststof-en Polymeerchemie" ["Plastic and Polymer Chemistry"], R van der Laan, ed. Bohn-Stafleu-VanLochum, 269-289, ISBN 90 313 2896 0, Saechtling, "Kunststoff Taschenbuch", Hanser Verlag, $25^{th}$ edition, ISBN 3 446 164987, for groups of plastics, and particulars about them, and Gächter, Müller, "Kunststoff Additive", Hanser Verlag, $3^{rd}$ edition, ISBN 3 446 156275, for additives used in this technology.

The abbreviations used hereinafter can be found in the above references. In a few places, TPE is used for thermoplastic elastomer axed TPU for thermoplastic polyurethane, which is considered a species of TPE.

DE102014004158 describes a load transmission assembly with a gear, provided with a hollow plastics shaft in which a second (metal or plastics) tube part is arranged. The tube parts are provided with interlocking portions reduced in diameter. During manufacture the plastics shaft is to be heated locally to execute such reduction in diameter.

DE19538360 concerns a cardan shaft for vehicles, with a fiber reinforced shaft on which two flanges have been arranged by injection molding.

The present invention concerns:
a device, for example a machine part, in particular a part of a sorting machine for eggs, comprising:
a body with a cylinder shape of substantially carbon fibers with the fibers in the longitudinal direction of the cylinder shape, the body functioning as carrier body with a carrier surface, and
at least a single circumferential body of a plastic arranged on the body through injection molding, the circumferential body being arranged on at least a part of the carrier surface.

It has been found that such parts, for example, but not exclusively, shaft bodies, possess comparable mechanical features to those of hitherto used parts substantially of steel, for example steel having applied thereon layers of a suitable plastic. Shafts of steel tend to deform slightly when used intensively.

By contrast, the materials used according to the present invention offer not only the great advantages of fast production but also the possibility of fast, desired adaptations, both mechanical and dimensional.

Further, their elastic material properties guarantee a greater dimensional stability. This dimensional stability or shape retaining property is of great relevance in, for example, a sorting machine for eggs, where intensive use can lead to loss of shape, and consequently to egg breakage.

Machine parts obtained in the above manner have great advantages in the choice of specifications where high accuracies are required.

Furthermore, they have been found to possess highly suitable strengths and to remain highly dimensionally stable upon prolonged use.

This method has been found to be low cost and highly efficient. The plastics that can be processed and applied with great advantage include inter alia TPU, PBT, POM, PA, and PVC.

Preferably, the cylinder-shaped body (substantially of carbon fibers) is completely embedded in the injection molding material (i.e. completely surrounded by the at least one circumferential body and optional intermediate spacers, with the respective injection molding material for instance forming a closed whole around that body). In this manner, improved food safety and hygiene can be achieved. Especially in food applications, coming loose of the carbon fibers (e.g. by wear) is not allowed, since carbon fiber is not food safe. By wholly overmolding the carbon fiber, this is prevented.

More particularly, shafts with circumferential bodies may be manufactured in their entirety in two successive runs, one for the cylinder shape and, following this, one for the circumferential body, in consequence of which, in a suitable manner, fewer deviations in the desired dimensions and specifications occur.

To those skilled in the art it will be clear, moreover, that an own industrial and fast production is thus obtained and this is of great economic benefit.

Further, PBT, POM, and PA are specified, which are further examples of thermoplastics, more particularly referred to as engineering plastics.

The present invention further concerns:

a method for manufacturing a device with a cylinder shape, for example a hollow shaft functioning as carrier body with carrier surface, provided with at least a single circumferential body, comprising:
- extruding for obtaining the cylinder shape of substantially carbon reinforced fiber material with carbon fibers substantially in the longitudinal direction of the cylinder shape, and
- injection molding a plastic on the cylinder shape for obtaining the circumferential body on at least a part of the carrier surface.

Surprisingly, the processability of the chosen materials under the desired process conditions has been found to be highly suitable for the applications that are described in more detail hereinafter. About this, more particularly, it is mentioned:
- that the 3D oriented injection molding has been unexpectedly suitably combined with the 1D configuration of the body of cylinder shape, and
- that, for the usual injection molding times, the required temperatures and pressures have been found to be highly suitable and usable.

Figure 2:
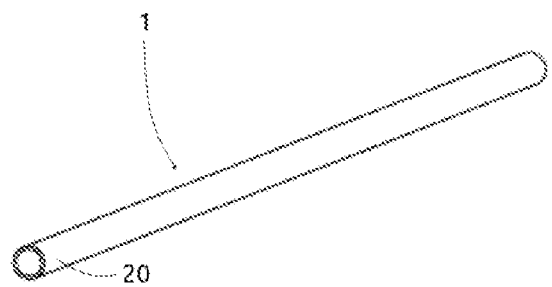
Figure 3:
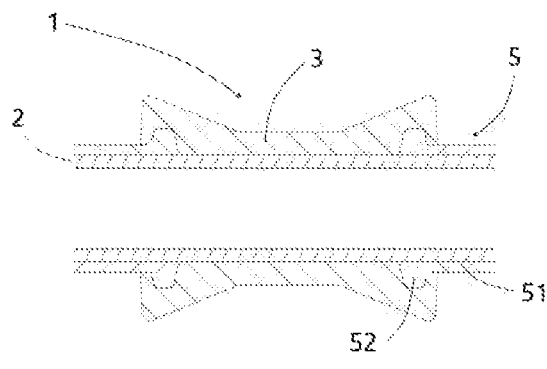
Figure 4:
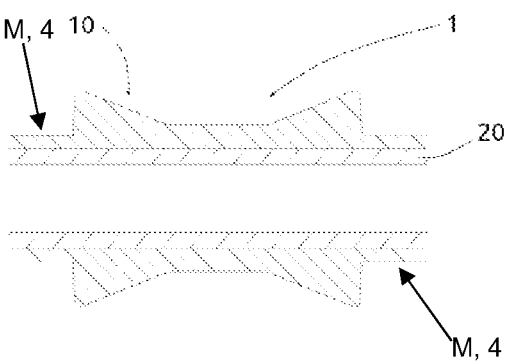
Figure 5:
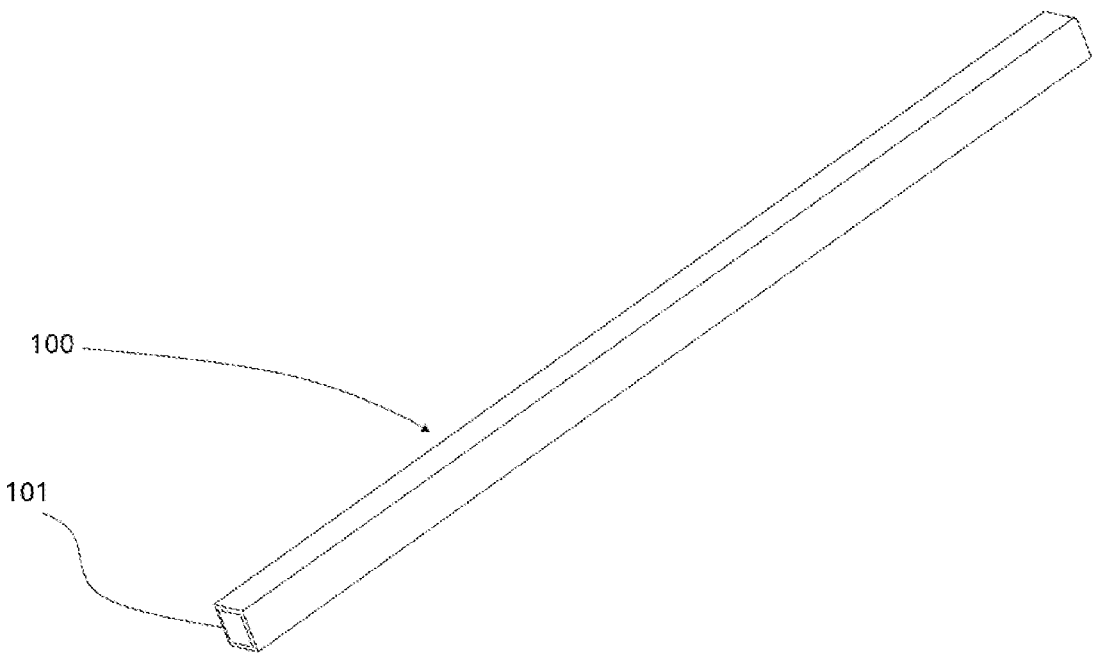
Figure 6:
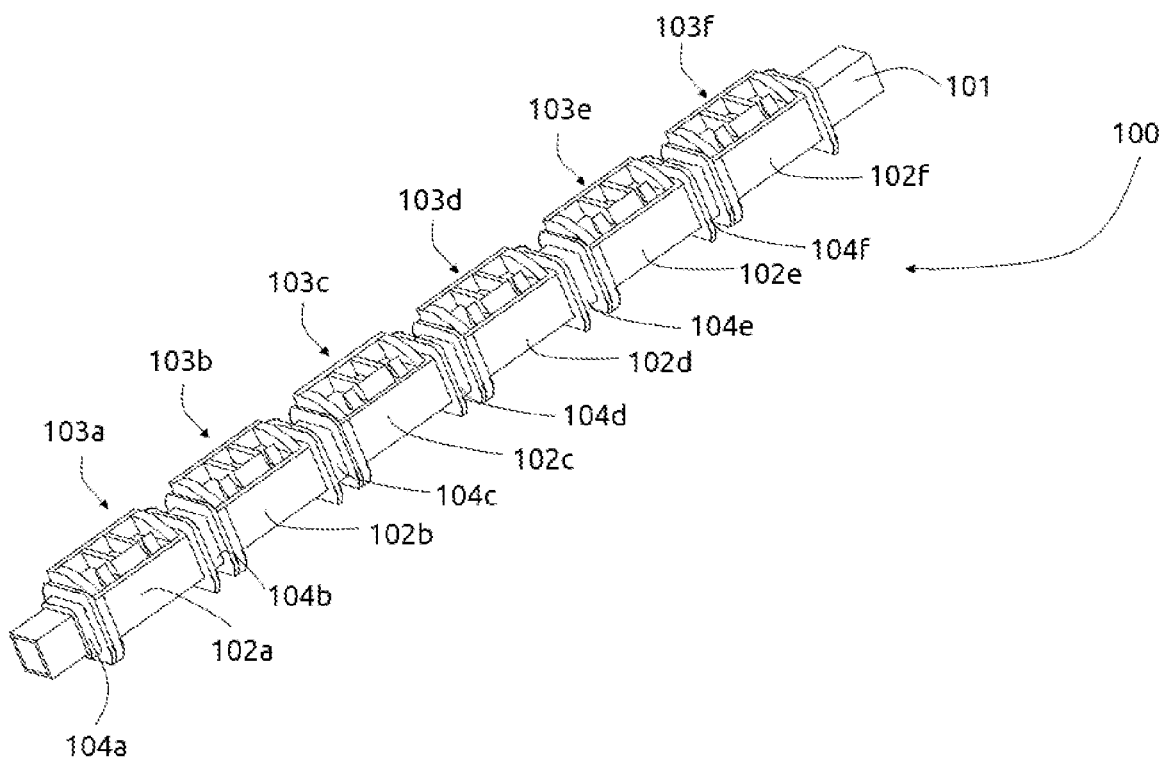
Figure 7:
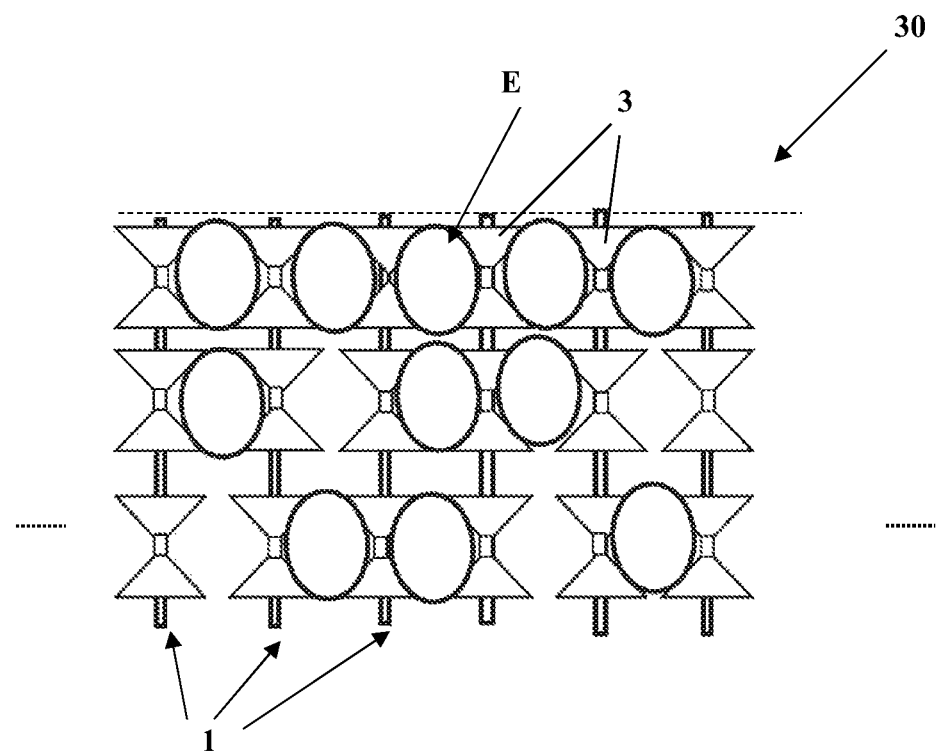

In the following, the invention is explained in detail on the basis of a drawing, in which:

FIG. 1 gives an isometric view of a first exemplary embodiment of a machine part where the invention can be used, FIG. 2 gives an isometric view of the machine part according to FIG. 1 where the invention has been used, FIG. 3 gives a cross section showing the machine part of FIG. 1 according to the prior art, FIG. 4 gives a cross section showing the machine part of FIG. 1 according to the present invention, FIG. 5 gives an isometric view of a second exemplary embodiment of a machine part where the invention can be used, FIG. 6 gives an isometric view of the machine part according to FIG. 5 where the invention has been used; and FIG. 7 shows schematically a top plan view of a part of an egg sorting machine with roller shafts.

In these FIGURES, for the same parts and particulars, the same reference numerals and indications will be used.

In FIG. 1, in an isometric view, a machine part of a sorting machine, more particularly an egg sorting machine, is shown. There is represented a so-called roller shaft 1 of circular cross section, comprising a hollow shaft body 2, of a suitable type of steel, having circumferential bodies provided thereon through injection molding, in particular diabolo-shaped roller bodies 3 (sometimes also referred to as hourglass-shaped roller bodies 3). Such shafts 1 are preferably (for instance in the sorting machine mentioned) connected at both ends with two respective endless chains (or like transmission elements), in particular for the purpose of (motor) drive. Each two successive roller bodies 3 on these roller shafts 1 can form a carrier position for an egg. The array of circumferential bodies 3 may for instance have mutually the same shape and dimensions.

An example of an array of roller shafts 1 with circumferential bodies (for example of an egg sorting machine) is represented in FIG. 7. The roller shafts 1 may for instance be part of an endless conveyor 30. In particular, the shafts 1 extend parallel to each other, and are each provided with an array of roller bodies 3, generally diabolo-shaped rollers, such that the roller bodies 3 of adjacent shafts define nests for carrying products (for example, eggs E). A transport or conveying direction of the conveyor 30 is in particular at right angles to the longitudinal direction of each of the roller shafts 1. A drive, for example one or more electric motors, transmission means and the like, are not represented since the configuration of such a roller conveyor as such is generally known.

To those skilled in the art, it will be clear that for the roller bodies 3 suitable plastics are chosen and also that for conveying such delicate products without damage, high accuracies for these machine parts are required.

It has been found, however, that, given intensive use, which includes regular thorough chemical cleaning, the properties of these roller shafts 1 with roller bodies 3 change. The shaft bodies prove to bend to some extent and the roller bodies exhibit wear, due both to their being used much and to the cleaning.

FIG. 2 shows in isometric view a same type of shaft, for example a roller shaft 1, with the shaft body 20 substantially manufactured by pultrusion of carbon fiber material (FIG. 2 shows in particular the shaft body 20 of a roller shaft 1). More particularly, the pultrusion process is so executed that the carbon fibers substantially follow the direction of the shaft and are embedded in a matrix (or filler) of epoxy resin.

For such a machine part, this combination of materials has suitable mechanical properties, in particular as regards weight, wear, and flexibility, and is more suitable than the steel used heretofore. The percent of fiber in this matrix is between 50% and 80%. The fibrous material is of a generally used type, for instance from the firm of Mitsubishi, for instance having fiber strengths greater than 4000 MPa.

As follows from FIG. 2, the shaft body of the roller shaft has for instance a constant outer diameter (viewed in the shaft longitudinal direction). In other words, the shaft body preferably does not have any local portion reduced in diameter.

In FIG. 3 there is represented, according to the prior art, a cross section of a part of a roller shaft 1 of circular cross section having provided thereon by injection molding a shaft covering 5 and a roller body 3. More particularly, a steel shaft body has been overmolded with first covering parts 51 of PA, each provided with two collar edges 52.

Thereafter, by injection molding, roller bodies 3 have been provided which join these and, as mentioned above, are diabolo-shaped. These roller bodies 3 are formed from a mixture of PVC and NBR.

FIG. 4 shows a part of a device according to an exemplary embodiment of the invention. The device comprises, for example, a machine part, in particular a part of a sorting machine for eggs (see FIG. 7), comprising:

a body with a cylinder shape 20 of substantially carbon fibers with the fibers in the longitudinal direction of the cylinder shape, the body functioning as carrier body with a carrier surface, and at least a single circumferential body 10 of a plastic provided by injection molding on the body 20, the circumferential body 10 being provided on at least a part of the carrier surface.

In FIG. 4 there is shown, in particular, a cross section of a part of a roller shaft 1 of circular cross section having provided thereon (at least, on the shaft body 20, shown in FIG. 2, substantially manufactured by pultrusion of carbon fiber material) through injection molding a covering M with roller body 10 consisting of one whole. The machine part shown here has been manufactured according to the present invention, with the shaft 20 preferably consisting of a matrix of epoxy resin with carbon fibers in the length direction of the shaft body shown, and with the overmolding having been executed with substantially a thermoplast, preferably TPU. This combination of materials has proven highly suitable.

It has been found, for instance, that TPU adheres very well to carbon fiber (with fibers in the longitudinal direction), so that there is no need, for instance, for any (local) reduction in diameter of the carrier tube 20 for the purpose of a proper adhesion. This is a great advantage since it means that no heating (and deformation) of the carrier tube 20 is needed during the injection molding step, so that weakening of that tube can be avoided. In particular, the injection molding step (i.e. the provision on the formed shaft body 20 of the covering with roller bodies 10 and optional spacers 4) is carried out on a non-heated ('cold') shaft body 20.

In particular, the roller bodies 10 jointly form a circumferential body, and are for instance joined together via integral intermediate covering parts M (see FIG. 4). In other words, the covering M and roller bodies 10 are preferably manufactured as a whole, i.e. in one piece (in the same injection molding step), and, in particular, provided as one whole on the shaft body 20 already formed by pultrusion. As follows further from FIG. 4, spacer parts 4 of the covering M may be provided between (adjacent) circumferential bodies 10, and, for instance, be manufactured integrally with those circumferential bodies (in the same injection molding step).

In FIG. 5 an isometric view is shown of a second exemplary embodiment of a machine part where the invention can be used. More particularly, a tube 100 with a tubular body 101 of square cross section is shown. In the same way as mentioned above, this tubular body has been obtained through pultrusion of carbon fiber material. In applications, this tube will again function as a carrier body for further parts that are applied thereon by injection molding, also referred to as overmolding.

As appears from FIG. 5, the tubular shape has for instance a constant angular outer circumference, viewed in the tube longitudinal direction (i.e. the tube is not provided with any local portion reduced in diameter).

More particularly, in FIG. 6 the tube 100 shown in FIG. 5 is shown, with machine parts 102-104 provided thereon through injection molding (overmolding), more particularly a tube 100 having thereon six fixing blocks for gripper halves for passing on eggs, for instance as described in NL1029748. Hitherto, these blocks, after extrusion of each such block, were slipped in succession over a steel tube. To those skilled in art it will be clear that the accuracy of each separate block needs to be very high, with even small deviations leading in the usual way to improper configurations, and consequently breakage in the processing of eggs. In addition, this manner of manufacturing is highly time-consuming.

In this FIG. 6 there are shown the above-mentioned six fixing blocks 102 *a-f*, with also, at their top shown here, as many grates 103 *a-f* with click edges for snap-fitting the gripper halves (not shown here), as well as, between these fixing blocks 102 *a-f*, as many spacers 104 *a-f* which are to ensure the mutual distance between the grippers. This whole of formerly loose parts is now, according to the present invention, provided as a whole by injection molding (overmolding) on the tubular body 101. In this application, mostly POM is used as plastic.

Further thermoplasts as generally known, and especially suitable for the application described here, are, by way of example and not limited thereto, TPE, TPS, TPO, TPV, TPC, TPA, TPZ, SBS, TPEE, PE derived compounds, PBT, POM, PA, (liquid) silicone rubbers, as well as several rubber compounds such as SBR, IR, IRR, NR, CSM, EPM, VMQ, AU, or ACM. Further, preferably hardnesses shore A and shore D apply, established when these materials are ready for use, that is, 24 hours after the end of the injection molding process, as is known to those skilled in the art.

Clearly, all possible surface profiles can be chosen, with closed circumferences (closed describing lines), in the following indicated in a random and non-limiting manner, for example, shaft-shaped, of oval cross section, of rectangular cross section, less or more curved or domed surfaces, et cetera.

To those skilled in the art it will be clear that such profiles will have many applications, in machine construction as indicated above for egg sorting machines, but also in the automotive industry, or further similar means of transport, see for example products shown at www.ptonline.com, such as airbag parts.

Furthermore, the invention provides a method for manufacturing a device with a cylinder shape, for example a machine part functioning as carrier body with carrier surface, provided with at least a single circumferential body, comprising:

extruding for obtaining the cylinder shape of substantially carbon reinforced fiber material with carbon fibers substantially in the longitudinal direction of the cylinder shape, and injection molding of plastics on the cylinder shape for obtaining the circumferential body on at least a part of the carrier surface.

Injection molding, more particularly overmolding of carrier bodies, is generally known (see the references specified hereinabove). It has been found that set-ups can be used that allow automation.

In particular, for injection molding of the above-mentioned plastics on the cylinder shape, an injection angle α is chosen with 0≤α≤90 with respect to the longitudinal direction mentioned, with α in degrees, and preferably an injection angle α that is less than 90 degrees, for example an angle α in the range of 0-70 degrees, preferably an angle α in the range of 0-45 degrees.

It has been found that by the use of an injection angle of less than 90 degrees, deformation of the cylinder shape can be avoided or reduced, in particular at an injection angle of less than about 70 degrees and more particularly at an angle of less than 45 degrees. In particular, the cylinder shape is not locally deformed (e.g. by heating), and use of a strengthening insert can be avoided.

In a further embodiment, for the injection molding of the above-mentioned plastics on the cylinder shape, a fluid pressure p is chosen with 100≤p≤1000, with p in bar.

In yet a further embodiment, for the injection molding of the above-mentioned plastics on the cylinder shape, an injection molding operating temperature T is chosen with 100≤T≤300, with T in degrees centigrade.

To those skilled in the art it will be clear that the invention is not limited to the exemplary embodiments described. Various modifications are possible within the scope of the invention as set forth in the claims.

The invention claimed is:

1. A machine part of a sorting machine for eggs, comprising:
a body with a cylinder shape of substantially carbon fibers with the fibers in the longitudinal direction of said cylinder shape, said body functioning as a carrier body with a carrier surface, and
adjacent circumferential bodies of a plastic provided through injection molding on said body, the circumferential bodies being provided on at least a part of the carrier surface, wherein on the carrier body, spacers between adjacent circumferential bodies are provided through injection molding.

2. The machine part according to claim 1, wherein the carrier surface through injection molding is provided with a shaft covering (M) with an array of the circumferential bodies.

3. The machine part according to claim 1, wherein the plastic comprises substantially a thermoplast.

4. The machine part according to claim 3, wherein the thermoplast comprises substantially TPE.

5. The machine part according to claim 3, wherein the thermoplast comprises substantially PBT, or POM, or PA, or PVC.

6. The machine part according to claim 1, wherein the machine part comprises a hollow cylindrical shaft.

7. The machine part according to claim 1, wherein each circumferential body comprises a diabolo-shaped roller element.

8. The machine part according to-claim 1, wherein the machine part comprises a hollow tube of square cross section.

9. The machine part according to-claim 1, wherein the machine part comprises a hollow tube of rectangular cross section.

10. A sorting machine for eggs, comprising at least one device, the device comprising:
a body with a cylinder shape of substantially carbon fibers with the fibers in the longitudinal direction of said cylinder shape, said body functioning as a carrier body with a carrier surface, and
an array of circumferential bodies of a plastic provided through injection molding on said carrier body, the circumferential bodies being provided on at least a part of the carrier surface,
wherein the carrier body is embedded in a covering comprising the array of circumferential bodies.

11. The sorting machine according to claim 10, wherein each device comprises a hollow shaft body having thereon diabolo-shaped roller bodies.

12. The sorting machine according to claim 11, wherein covering parts extend between the roller bodies.

13. The sorting machine according to claim 10, wherein the carrier body is completely surrounded by the array of circumferential bodies.

14. The sorting machine of claim 13, wherein the carrier body is completely surrounded by both the array of circumferential bodies and intermediate spacers.

15. The sorting machine according to claim 10, wherein the sorting machine includes an array of roller shafts with circumferential bodies, wherein the shafts extend parallel to each other, wherein the circumferential bodies define diabolo-shaped rollers, wherein the diabolo-shaped rollers of adjacent shafts define nests for carrying eggs.

16. The sorting machine of claim 10, wherein the at least one device comprises an array of the devices.

17. A method for manufacturing a device, the device being a machine part of a sorting machine for eggs, functioning as a carrier body with a carrier surface, provided with circumferential bodies, comprising:
manufacturing with pultrusion a cylinder shape of substantially carbon reinforced fiber material with carbon fibers substantially in the longitudinal direction of the cylinder shape, and
injection molding a plastic on the cylinder shape for obtaining the circumferential bodies on at least a part of said carrier surface
wherein on the carrier body, spacers between adjacent circumferential bodies are provided through injection molding.

18. The method according to claim 17, wherein the plastic comprises substantially a thermoplast.

19. The method according to claim 18, wherein the thermoplast comprises substantially TPE.

20. The method according to claim 18, wherein the thermoplast comprises substantially PBT, or POM, or PA, or PVC.

21. The method according to-claim 17, wherein for the injection molding of said plastic on the cylinder shape, an injection angle α is chosen with 0≤α≤90 with respect to said longitudinal direction, with α in degrees.

22. The method of claim 21, wherein the injection angle is in the range of 0-70 degrees.

23. The method according to claim 17, wherein for the injection molding of said plastic on the cylinder shape, a fluid pressure p is chosen with 50≤p≤1000, with p in bar.

24. The method according to claim 17, wherein for the injection molding of said plastic on the cylinder shape, an injection molding operating temperature T is chosen with 10≤T≤300, with T in degrees centigrade.

25. The method according to claim 17, wherein the cylinder shape manufactured with pultrusion, viewed in the longitudinal direction thereof, has a constant outer circumference, wherein the cylinder shape manufactured with pultrusion retains the constant outer circumference during the injection molding thereon of the circumferential bodies.

26. The method of claim 25, wherein the cylinder shape has no portion of reduced diameter.

27. The method according to claim 17, wherein the cylinder shape manufactured with pultrusion is provided with a shaft covering with the circumferential bodies.

28. The method of claim 27, wherein the cylinder shape is completely surrounded by the shaft covering.

29. The method according to claim 17, wherein the cylinder shape manufactured with pultrusion is substantially not deformed and/or heated prior to and during the injection molding of the plastic on that cylinder shape.

* * * * *